United States Patent
Hamilton, II et al.

(10) Patent No.: US 8,830,032 B2
(45) Date of Patent: Sep. 9, 2014

(54) BIOMETRIC-BASED IDENTITY CONFIRMATION

(75) Inventors: Rick A. Hamilton, II, Charlottesville, VA (US); Brian M. O'Connell, Research Triangle Park, NC (US); Thomas M. Reeves, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 12/911,024

(22) Filed: Oct. 25, 2010

(65) Prior Publication Data
US 2012/0098640 A1    Apr. 26, 2012

(51) Int. Cl.
*G06T 1/00* (2006.01)
*G06T 7/00* (2006.01)

(52) U.S. Cl.
USPC ......... 340/5.83; 340/5.52; 340/5.53; 340/5.8; 340/5.81; 340/5.82

(58) Field of Classification Search
USPC ................................ 340/5.52–5.53, 5.8–5.83
See application file for complete search history.

(56) References Cited

U.S. PATENT DOCUMENTS

| | | | |
|---|---|---|---|
| 5,876,926 A * | 3/1999 | Beecham | 435/5 |
| 6,798,334 B1 * | 9/2004 | Meister et al. | 340/5.52 |
| 6,810,480 B1 * | 10/2004 | Parker et al. | 713/186 |
| 6,836,554 B1 * | 12/2004 | Bolle et al. | 382/116 |
| 6,938,159 B1 * | 8/2005 | O'Connor et al. | 713/186 |

(Continued)

OTHER PUBLICATIONS

Gomez, E. et al., "Biometric Identification System by Lip Shape", Proceedings of the 36th Annual 2002 International Carnahan Conference on Security Technology, pp. 39-42.

(Continued)

*Primary Examiner* — Daniel Wu
*Assistant Examiner* — Son M Tang
(74) *Attorney, Agent, or Firm* — William E. Schiesser; Keohane & D'Alessandro, PLLC (57) ABSTRACT

Embodiments of the present invention provide an approach for confirming/verifying an identity of a test taker using a biometric analysis. For example, in the medical field, it is desirous to ensure that a given test is being administered to a correct individual (e.g., "test taker'). By comparing a given/submitted identity against a biometric-based identity, such verification can be performed. In one embodiment, the individual will submit biometric information via a biometric reader or the like coupled to a testing apparatus. The identity submitted by or on behalf of the individual (referred to herein as a "submitted identity") will then be confirmed against the individual's identity as determined based on the biometric reading (referred to herein as a "biometric-based identity"). If the submitted identity and the biometric-based identity match, results of the test will be accepted. If the two identities do not match, then results of the test will be denied. Alternatively, if the identities do not match, then the testing apparatus could refuse to commence or complete the test.

21 Claims, 4 Drawing Sheets

(56) References Cited

U.S. PATENT DOCUMENTS

| | | | |
|---|---|---|---|
| 6,985,070 B1* | 1/2006 | Parker | 340/5.33 |
| 7,317,815 B2 | 1/2008 | Steinberg et al. | |
| 7,421,098 B2 | 9/2008 | Bronstein et al. | |
| 7,609,145 B2* | 10/2009 | Martis et al. | 340/5.1 |
| 7,809,954 B2* | 10/2010 | Miller et al. | 713/186 |
| 8,087,072 B2* | 12/2011 | Gajjala et al. | 726/6 |
| 8,320,638 B2* | 11/2012 | Pitt et al. | 382/115 |
| 8,370,639 B2* | 2/2013 | Azar et al. | 713/186 |
| 8,503,972 B2* | 8/2013 | Haler et al. | 455/404.1 |
| 2004/0125991 A1 | 7/2004 | Yokoi | |
| 2004/0161728 A1* | 8/2004 | Benevento et al. | 434/118 |
| 2006/0182318 A1* | 8/2006 | Shigeta | 382/124 |
| 2007/0048765 A1* | 3/2007 | Abramson | 435/6 |
| 2007/0136107 A1* | 6/2007 | Maguire et al. | 705/4 |
| 2008/0061927 A1* | 3/2008 | Manton | 340/5.53 |
| 2008/0131860 A1* | 6/2008 | Redd et al. | 434/350 |
| 2008/0243005 A1* | 10/2008 | Jung et al. | 600/481 |
| 2009/0141944 A1* | 6/2009 | Abe | 382/115 |
| 2010/0303307 A1* | 12/2010 | Rothschild | 382/116 |
| 2011/0090048 A1* | 4/2011 | Li et al. | 340/5.82 |
| 2011/0173308 A1* | 7/2011 | Gutekunst | 709/222 |
| 2012/0098640 A1* | 4/2012 | Hamilton et al. | 340/5.52 |

OTHER PUBLICATIONS

Kaushik, V. et al., "An Efficient 3D Face Recognition Algorithm", 2009 3rd International Conference on New Technologies, Mobility and Security (NTMS), pp. 1-5.

Mehra, A. et al., "Expert System for Speaker Identification using Lip Features with PCA", 2010 2nd International Workshop on Intelligent Systems and Applications (IS), pp. 1-4.

Paik, K. et al., "On a Lip Print Recognition by the Pattern Kernels with Multi-Resolution Architecture", 2001 International Conference on Image Processing, vol. 3, pp. 246-249.

Choras, M., "Emerging Methods of Biometrics Human Identification", Second International Conference on Innovative Computing, Information and Control, 2007, pp. 365-365.

* cited by examiner

BIOMETRIC-BASED IDENTITY CONFIRMATION

TECHNICAL FIELD

The present invention generally relates to biometric identification and user association. Specifically, the present invention relates to a system that helps confirm the identity of a test taker (e.g., a medical test taker) using biometric information.

BACKGROUND

As medical testing continues to become more computerized, there is a growing need to confirm the identity of an individual taking a medical test. That is, it is important to ensure that a given test is, in fact, being administered to the correct individual. Failure to do so can result in confusion of results, wasting of resources, etc. For example, if a certain individual is being given a respiratory exam, there is a need to ensure that the test taker is the intended test taker. Existing solutions are limited to having another individual visually determine that the recipient of the test is the correct test recipient. Such a requirement is costly, and may not be feasible for certain applications.

SUMMARY

Embodiments of the present invention provide an approach for confirming/verifying an identity of a test taker using a biometric analysis. For example, in the medical field, it is desirous to ensure that a given test is being administered to a correct individual (e.g., "test taker'). By comparing a given/submitted identity against a biometric-based identity, such verification can be performed. In one embodiment, the individual will submit biometric information via a biometric reader or the like coupled to a testing apparatus. The identity submitted by or on behalf of the individual (referred to herein as a "submitted identity") will then be confirmed against the individual's identity as determined based on the biometric reading (referred to herein as a "biometric-based identity"). If the submitted identity and the biometric-based identity match, results of the test will be accepted. If the two identities do not match, then results of the test will be denied. Alternatively, if the identities do not match, then the testing apparatus could refuse to commence or complete the test.

A first aspect of the present invention provides a method for biometric-based identity confirmation, comprising: receiving a submitted identity of an individual taking a test; receiving a biometric reading from the individual via a biometric reader coupled to a testing apparatus associated with the test; determining a biometric-based identity of the individual using the biometric reading; and confirming whether the submitted identity matches the biometric-based identity.

A second aspect of the present invention provides a system for biometric-based identity confirmation, comprising: a bus; a processor coupled to the bus; and a memory medium coupled to the bus, the memory medium comprising instructions to: receive a submitted identity of an individual taking a test; receive a biometric reading from the individual via a biometric reader coupled to a testing apparatus associated with the test; determine a biometric-based identity of the individual using the biometric reading; and confirm whether the submitted identity matches the biometric-based identity.

A third aspect of the present invention provides a computer program product for biometric-based identity confirmation, the computer program product comprising a computer readable storage media, and program instructions stored on the computer readable storage media, to: receive a submitted identity of an individual taking a test; receive a biometric reading from the individual via a biometric reader coupled to a testing apparatus associated with the test; determine a biometric-based identity of the individual using the biometric reading; and confirm whether the submitted identity matches the biometric-based identity.

A fourth aspect of the present invention provides a method for deploying a system for biometric-based identity confirmation, comprising: deploying a computer infrastructure being operable to: receive a submitted identity of an individual taking a test; receive a biometric reading from the individual via a biometric reader coupled to a testing apparatus associated with the test; determine a biometric-based identity of the individual using the biometric reading; and confirm whether the submitted identity matches the biometric-based identity.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for confirming/verifying an identity of a test taker using a biometric analysis. For example, in the medical field, it is desirous to ensure that a given test is being administered to a correct individual (e.g., "test taker'). By comparing a given/submitted identity against a biometric-based identity, such verification can be performed. In one embodiment, the individual will submit biometric information via a biometric reader or the like coupled to a testing apparatus. The identity submitted by or on behalf of the individual (referred to herein as a "submitted identity") will then be confirmed against the individual's identity as determined based on the biometric reading (referred to herein as a "biometric-based identity"). If the submitted identity and the biometric-based identity match, results of the test will be accepted. If the two identities do not match, then results of the test will be denied. Alternatively, if the identities do not match, then the testing apparatus could refuse to commence or complete the test.

Figure 1:
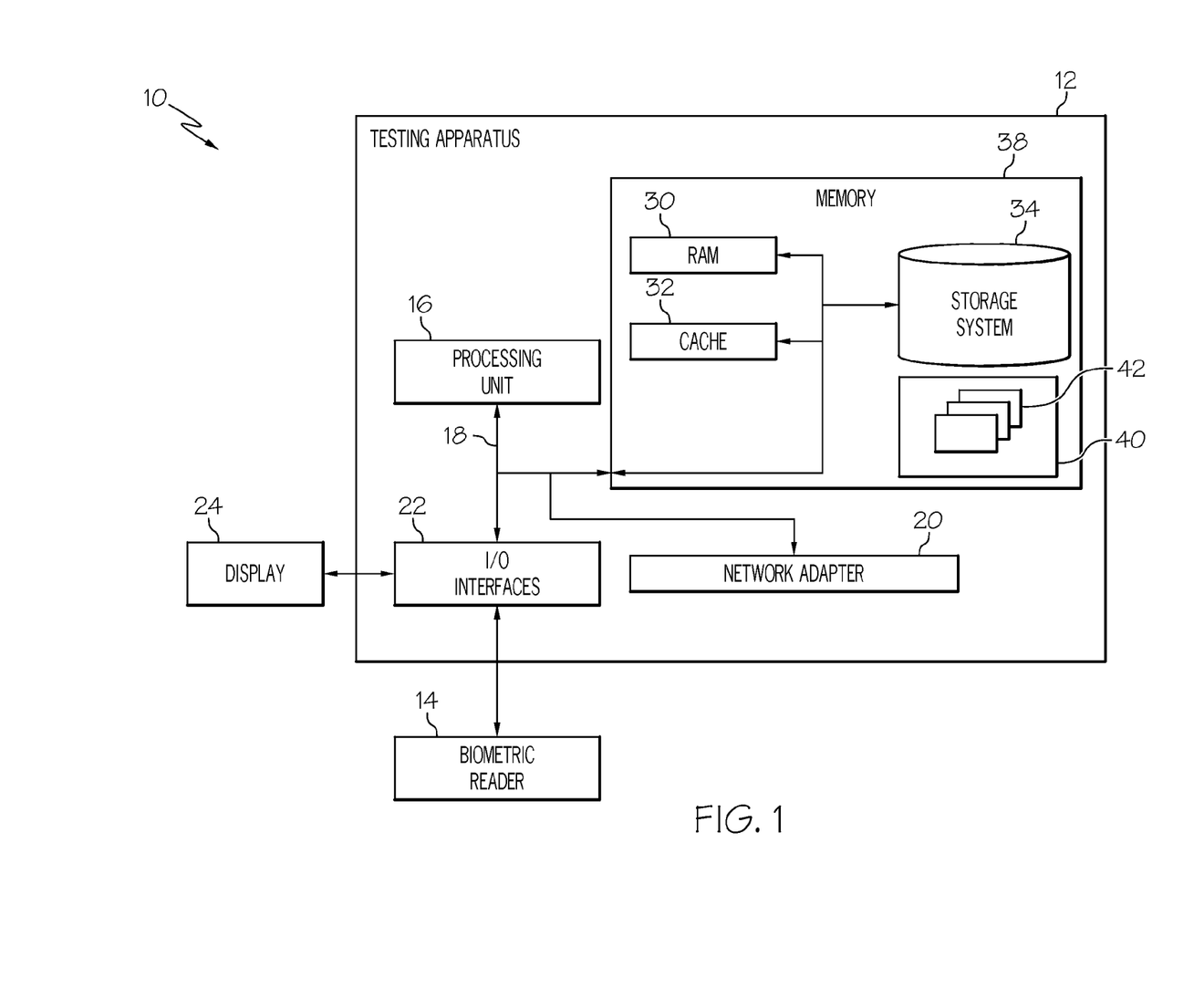
FIG. 1 depicts a testing apparatus with a biometric reader according to an embodiment of the present invention.

Referring now to FIG. 1, a testing apparatus 12 with attached/coupled biometric reader 14 within testing environment 10 is shown. System 12 can be operational with numerous other general purpose or special purpose computing system environments or configurations. Examples of well-known computing systems, environments, and/or configurations that may be suitable for use with testing apparatus 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Embodiments of testing apparatus 12 may comprise one or more elements that can be described in the general context of computer system-executable instructions, such as program modules, being executed by a computer system. Generally, program modules may include routines, programs, objects, components, logic, data structures, and so on, that perform particular tasks or implement particular abstract data types. Testing apparatus 12 may be practiced in distributed computing environments where tasks are performed by remote processing devices that are linked through a communications network. In a distributed computing environment, program modules may be located in both local and remote computer system storage media including memory storage devices.

As shown in FIG. 1, testing apparatus 12 is shown in the form of a general-purpose computing device. The components of testing apparatus 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Testing apparatus 12 typically includes a variety of computer system readable media. Such media may be any available media that is accessible by testing apparatus 12, and it includes both volatile and non-volatile media, removable and non-removable media.

System memory 28 can include computer system readable media in the form of volatile memory, such as random access memory (RAM) 30 and/or cache memory 32. Testing apparatus 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Identity confirmation program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Testing apparatus 12 may also communicate with one or more external devices such as biometric reader 14 a keyboard, a pointing device, a display 24, etc.; one or more devices that enable a user to interact with testing apparatus 12; and/or any devices (e.g., network card, modem, etc.) that enable testing apparatus 12 to communicate with one or more other computing devices. Such communication can occur via I/O interfaces 22. Still yet, testing apparatus 12 can communicate with one or more networks such as a local area network (LAN), a general wide area network (WAN), and/or a public network (e.g., the Internet) via network adapter 20. As depicted, network adapter 20 communicates with the other components of testing apparatus 12 via bus 18. It should be understood that although not shown, other hardware and/or software components could be used in conjunction with testing apparatus 12. Examples include, but are not limited to: microcode, device drivers, redundant processing units, external disk drive arrays, RAID systems, tape drives, and data archival storage systems, etc.

Figure 2:
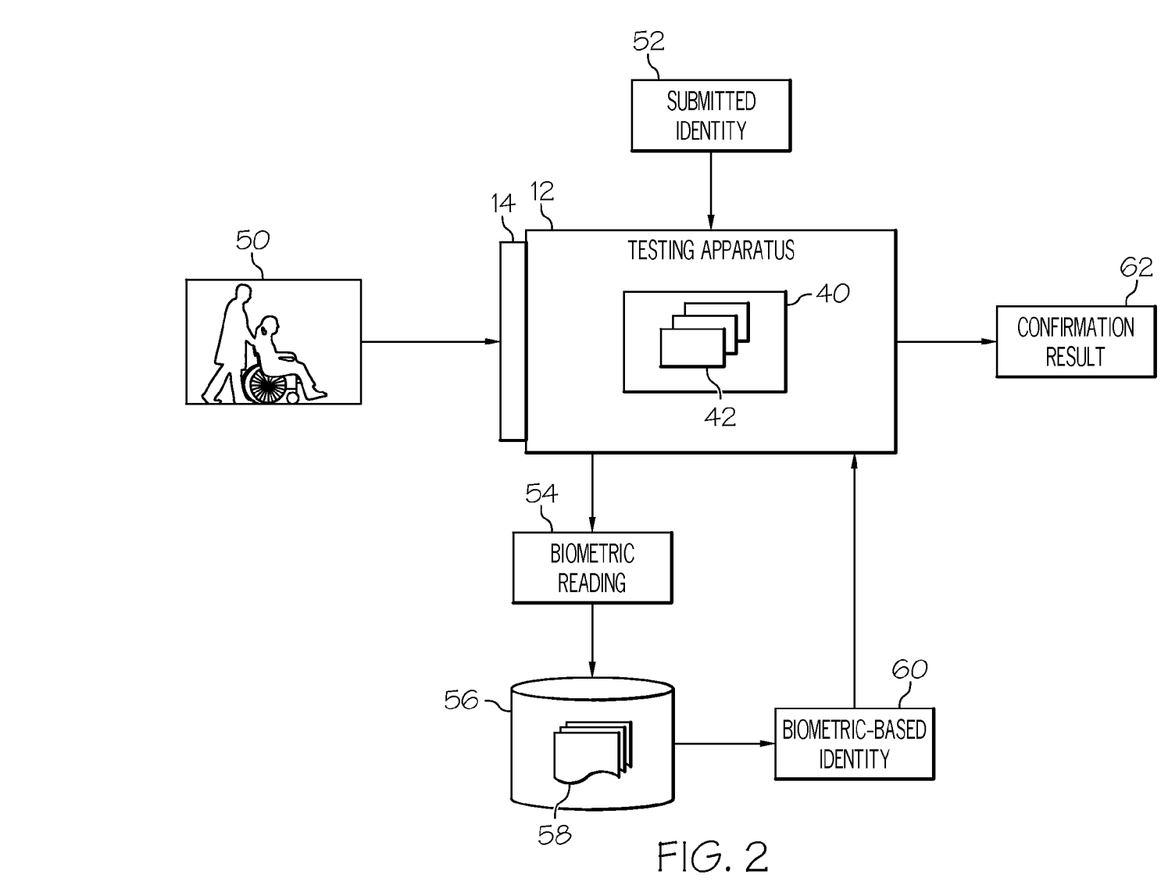
FIG. 2 depicts a process flow diagram according to an embodiment of the present invention.

Referring now to FIG. 2, an embodiment of the present invention will be explained in greater detail. As shown, a test taker/individual 50 is being administered a medical test/exam via testing apparatus 12. Along these lines, test taker 50 will submit biometric information. In a typical embodiment, the biometric information will be submitted via biometric reader 14, which can be any type of biometric reader (e.g., a retinal scanner, a lip print reader, a fingerprint reader, etc.). This information will be received by modules 42 of identity confirmation program 40. In addition, modules 42 will receive a submitted identity 52 of test taker 50. This information can be manually input, read/extracted from a document, etc. Moreover, if the testing apparatus 12 is dedicated to a particular individual, the submitted identity will be automatically extracted therefrom. Regardless, using biometric reading 54 obtained via biometric reader 14, modules 42 will access tables 58 of a database 56 or the like. Tables 58 typically comprise biometric readings associated with identities of corresponding individuals. As such, by cross-referencing tables 58 using biometric reading 54, modules 42 can determine a biometric-based identity 60 of test taker 50. Thereafter, modules 42 will compare submitted identity 52 to biometric-based identity 60 to determine if the two match (e.g., modules will produce/output a confirmation result 62). If the submitted identity 52 matches biometric-based identity 60 (e.g., identity is confirmed), then the test and/or its result will be allowed. If a match does not exist or a discrepancy of identity exists, then the test and/or its result will be denied.

These concepts will now be further explained in conjunction with the illustrative example set forth below.

It is understood in advance that although the illustrative example below utilizes lip print-based biometrics, any type of biometric measurement now known or later developed could be accommodated hereunder.

In this example, assume that a test taker is being administered a test that requires breathing into a tube such as a respiratory analysis (e.g., a spirograph, a breath alcohol analysis, etc.) or the like. As indicated above, it is desirous to ensure that the correct individual is being administered the test. In this example, biometric reader 14 of FIGS. 1-2 can be a lip print reader. Lip prints (similar to finger prints) are highly unique to each individual. Specifically, recent findings indicated that: (1) every individual has unique lip prints; (2) heredity plays some role in lip pattern development (e.g., similarities exist between parents and children); and (3) unique features are distinguishable (e.g., although parents and their children have similar groove traits, the prints are not identical, even in the case of identical twins).

When analyzing lip prints, it is noted that at least six types of distinguishing features exist: (1) Type I—clear-cut lines or grooves that run vertically across the lip; (2) Type II—straight grooves that disappear half-way into the lip instead of covering the entire breadth of the lip; (3) Type III—grooves that fork; (4) Type IV—grooves that intersect; (5) Type V—grooves that are reticulate; and (6) Type VI—grooves that do not fall into any of the above categories and cannot be differentiated morphologically. Experts typically do not categorize a lip print as a single type, since combinations of groove types exist in nearly all cases. Instead, experts tend to designate a single lip print type based on the prominence of groove type.

Along these lines, the lip print reader provides an area for the test taker to place their lips that contains a scanning surface. This surface records details about the test taker's lips used for identification. The scanning apparatus need not be required to record enough detail to detect the test taker based on their lip print, but rather only enough detail to determine if the test taker is the individual associated with the testing apparatus. For example, if the test taker was previously known to have lip prints having a set of four (4) reticulate grooves, and the biometric reading indicates that 4 reticulate grooves are not present, then the individual is not the specified test taker. In addition, the lip print reader does not need to cover the entirety of the device, rather one or two points on the device may be modified with the lip print reader.

Under the embodiments of the present invention, one of multiple methods may be used to acquire the lip print, these methods are modifications of those used for finger print scanning.

Optical—

Optical lip print imaging captures a digital image of the lip print using visible light. Beneath the top layer where the lips are placed is a light-emitting phosphor layer which illuminates the surface of the lips. The light reflected from the lips passes through the phosphor layer to an array of solid state pixels (a charge-coupled device) which captures a visual image of the lips.

Passive Capacitance—

In a passive capacitance system each sensor pixel is used to measure the capacitance at that point of the array. The capacitance varies between the ridges and valleys of the lips print due to the fact that the volume between the dermal layer (epidermis) and sensing element in valleys contains an air gap. The dielectric constant of the epidermis and the area of the sensing element are known values. The measured capacitance values may then be used to distinguish between lip print ridges and valleys.

Active Capacitance—

Sensors use a charging cycle to apply a voltage to the skin before measurement takes place. The application of voltage charges a low voltage capacitor, which is then discharged into the lips. The electric field between the lips and sensor follows the pattern of the ridges in the dermal skin layer. On the discharge cycle, the voltage across the dermal layer and sensing element is compared against a reference voltage in order to calculate the capacitance. The distance values are then calculated mathematically and used to form an image of the print. Active capacitance sensors measure the ridge patterns of the dermal layer like the passive capacitance method.

Once the apparatus has acquired the lip print, the lip print is compared to the individual's lips. If the comparison matches that of the specified individual, then the sample is known to come from that individual. If the comparison does not match, the system may refuse to accept the sample or may alert a monitoring agency of an identification match failure. As noted above, the comparison system is only used to verify that the individual providing the lip print is the individual authorized to use the apparatus. As such, the system only needs to detect that key characteristics of the specified individual's lips are present.

In providing a localized identification option, the comparison method may be performed locally on the apparatus. The apparatus would require the computational power necessary to implement the comparison method (e.g., via identify confirmation program 40). In this method the identification is done either before, during, or immediately after the sample submission. The identification system may provide some feedback to the test taker if the identification was inconclusive, false, or positive. If false or inconclusive, the test taker may be prompted to resubmit the sample.

In another embodiment, identification can be performed remotely. In this embodiment, the acquired lip print information may be transmitted using known methods to a remote processing center (e.g., based in a cloud computing environment). The transmission may be one way such that no response is provided, or may be two-way in that the test taker is notified if the lip print is a match. Such transmission may occur using any known communication method (e.g., Wi-Fi, mobile telephone network, etc.). In at least one embodiment, the lip print and the results may be sent to a remote processing center such that the sample is associated with the lip print.

An additional aspect of the present invention includes methods to digitize the collected identified sample followed by a network communication of same. This enables a remote use in addition to the local point of identification. In one example, the results are not stored at the point of collection for later retrieval, but rather the identity verified results would be transmitted for storage or analysis elsewhere.

In an alternate embodiment, a lip print may not be required for identification. Rather, a saliva sample may be taken and used for identification purposes. Furthermore, in some embodiments, rather than requiring the lips touch a surface, a high resolution camera may be employed to acquire the lip print of the test taker. Furthermore, lip prints may be used in a multi-factor authentication system. Such systems require multiple methods to be executed to identify a person. For example, the system may require a finger print and a lip print before providing access. In each of the cases outlined above, the uniqueness of lip prints may be used for authentication in any of the methods described here.

Figure 3:
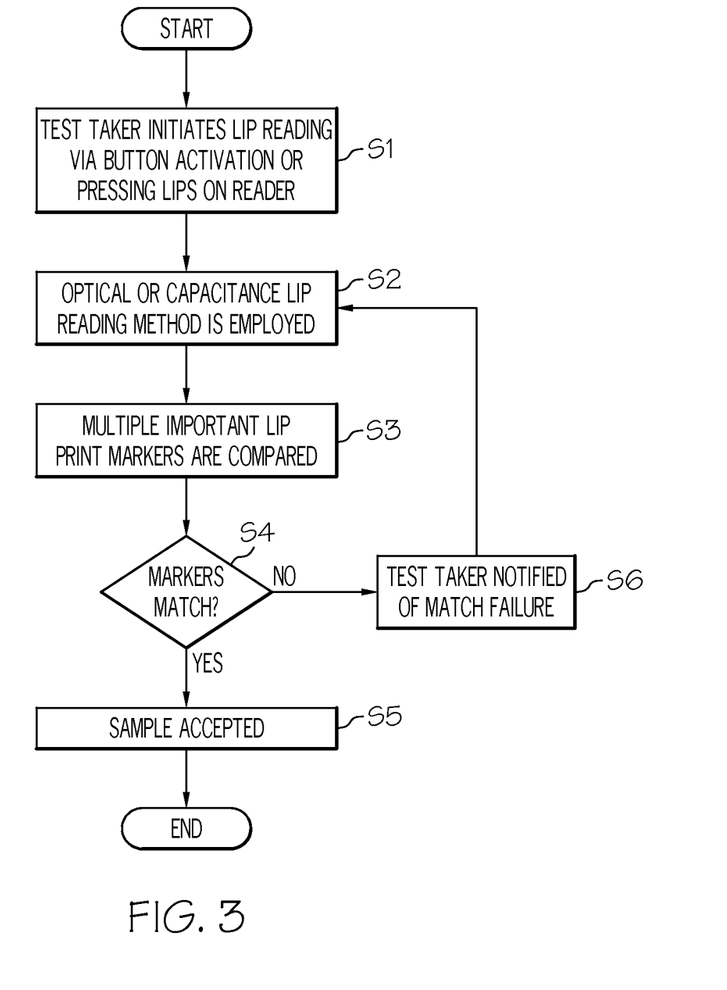
FIG. 3 depicts a method flow diagram according to an embodiment of the present invention.

Regardless of these alternatives, a method flow diagram according to this illustrative example is shown in FIG. 3. As shown, in step S1, a test taker initiates the lip print reading operation by e.g., pressing his/her lips on the lip reader, pressing a button, etc. In step S2, a lip print reading method (e.g., optical, capacitance, etc.) is employed. In step S3, lip print markers are compared, and in step S4, it is determined if those markers match. If so, the sample is accepted in step S5. If the markers did not match, notification of the failure is communicated (e.g., to the test taker) in step S6.

Figure 4:
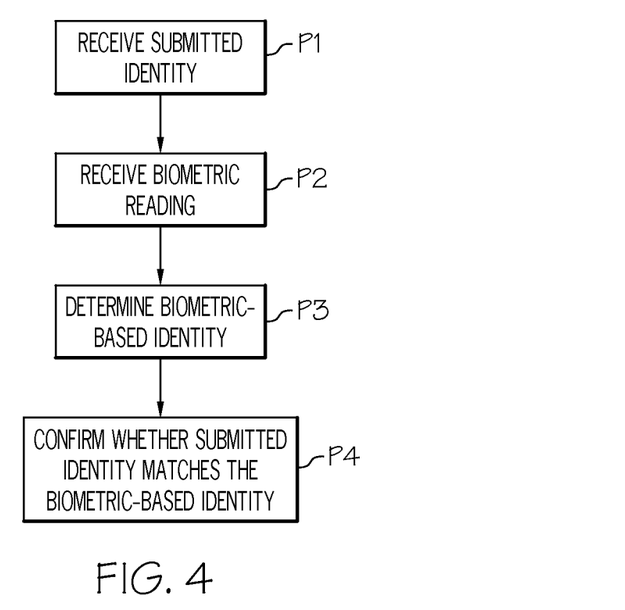
FIG. 4 depicts another method flow diagram according to an embodiment of the present invention.

Referring to FIG. 4, a more generalized method flow diagram according to an embodiment of the present invention is shown. As depicted, in step P1, a submitted identity of an individual taking a test is received. In step P2, a biometric reading from the individual is received via a biometric reader (e.g., a lip print reader, a retinal scanner, a fingerprint reader, etc.) coupled to a testing apparatus associated with the test. In step P3, a biometric-based identity of the individual using the biometric reading is determined. This is typically performed by accessing a table or the like that associates biometric readings with identities of corresponding individuals. In step P4, it is confirmed whether the submitted identity matches the biometric-based identity. As described above, a result of the test and/or the test itself is accepted if the submitted identity matches the biometric-based identity. The result and/or the test itself are denied if the submitted identity does not match the biometric-based identity.

While shown and described herein as a biometric-based identity confirmation solution, it is understood that the invention further provides various alternative embodiments. For example, in one embodiment, the invention provides a computer-readable/useable medium that includes computer program code to enable a computer infrastructure to provide biometric-based identity confirmation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide biometric-based identity confirmation functionality. In this case, the service provider can create, maintain, support, etc., a computer infrastructure, such as testing apparatus 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for biometric-based identity confirmation. In this case, a computer infrastructure, such as testing apparatus 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as testing apparatus 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for biometric-based identity confirmation, comprising:
    receiving a submitted identity of an individual taking a test, the test comprising a breath alcohol analysis test;
    receiving a biometric reading from the individual via a lip print reader coupled to a testing apparatus associated with the test, wherein the lip print reader comprises at least one of an optical lip print reader, an active capacitance lip print reader, and a passive capacitance lip print reader;
    digitizing the biometric reading;
    transmitting the digitized biometric reading to a device remote from the testing apparatus;
    determining, at the device remote from the testing apparatus, a biometric-based identity of the individual using the digitized biometric reading;
    confirming, at the device remote from the testing apparatus, whether the submitted identity matches the biometric-based identity;
    notifying the individual if the submitted identity does match the biometric-based identity; and
    denying a result of the test if the submitted identity does not match the biometric-based identity;
    wherein the lip print reader is configured to detect features comprising:
    grooves that run vertically across a lip of the individual; straight grooves that disappear half-way into the lip of the individual; grooves that fork on the lip of the individual; grooves that intersect on the lip of the individual; grooves that are reticulate on the lip of the individual; and grooves of other morphologies on the lip of the individual.

2. The method of claim 1, further comprising accepting a result of the test if the submitted identity matches the biometric-based identity.

3. The method of claim 1, the determining of biometric-based identity comprising accessing a table that associates biometric readings with identities of corresponding individuals.

4. The method of claim 1, further comprising prompting the individual to resubmit the biometric reading if the confirmation fails.

5. The method of claim 1, wherein the test requires the individual to breathe into the testing apparatus.

6. A system for biometric-based identity confirmation, comprising:
    a bus;
    a processor coupled to the bus; and
    a memory medium coupled to the bus, the memory medium comprising instructions to:
    receive a submitted identity of an individual taking a test, the test comprising a spirograph test;
    receive a lip print reading from the individual via a biometric reader coupled to a testing apparatus associated with the test, wherein the lip print reader comprises a passive capacitance lip print reader;
    digitize the biometric reading;
    transmit the digitized biometric reading to a device remote from the testing apparatus;
    determine, at the device remote from the testing apparatus, a biometric-based identity of the individual using the digitized biometric reading;
    confirm, at the device remote from the testing apparatus, whether the submitted identity matches the biometric-based identity;
    notify the individual if the submitted identity does match the biometric-based identity; and
    deny a result of the test if the submitted identity does not match the biometric-based identity;
    wherein the lip print reader is configured to detect features comprising: grooves that run vertically across a lip of the individual; straight grooves that disappear half-way into the lip of the individual; grooves that fork on the lip of the individual; grooves that intersect on the lip of the individual; grooves that are reticulate on the lip of the individual; and grooves of other morphologies on the lip of the individual.

7. The system of claim 6, the memory medium further comprising instructions to accept a result of the test if the submitted identity matches the biometric-based identity.

8. The system of claim 6, the testing apparatus further comprising a retinal scanner.

9. The system of claim 6, the testing apparatus further comprising a fingerprint reader.

10. The system of claim 6, the memory medium further comprising instructions to access a table that associates biometric readings with identities of corresponding individuals.

11. The system of claim 6, the memory medium further comprising instructions to prompt the individual to resubmit the biometric reading if the confirmation fails.

12. The system of claim 6, wherein the test requires the individual to breath into the testing apparatus.

13. A computer program product for biometric-based identity confirmation, the computer program product comprising a non-transitory computer readable medium, and program instructions stored on the non-transitory computer readable storage medium, to:
    receive a submitted identity of an individual taking a breath alcohol analysis test, the breath alcohol analysis test requiring the individual to breathe into a device of a testing apparatus;
    receive a biometric reading from the individual via a lip print reader coupled to a testing apparatus associated with the breath alcohol analysis test, wherein the lip print reader comprises an active capacitance lip print reader;
    digitize the biometric reading;
    transmit the digitized biometric reading to a device remote from the testing apparatus;
    determine, at the device remote from the testing apparatus, a digitized biometric-based identity of the individual using the biometric reading;
    confirm, at the device remote from the testing apparatus, whether the submitted identity matches the biometric-based identity;
    notify the individual if the submitted identity does match the biometric-based identity; and
    deny a result of the test if the submitted identity does not match the biometric-based identity;
    wherein the lip print reader is configured to detect features comprising:

grooves that run vertically across a lip of the individual; straight grooves that disappear half-way into the lip of the individual; grooves that fork on the lip of the individual; grooves that intersect on the lip of the individual; grooves that are reticulate on the lip of the individual; and grooves of other morphologies on the lip of the individual.

14. The computer program product of claim 13, further comprising program instructions stored on the non-transitory computer readable medium to accept a result of the test if the submitted identity and the biometric-based identity match.

15. The computer program product of claim 13, the testing apparatus further comprising a retinal scanner.

16. The computer program product of claim 13, the testing apparatus further comprising a fingerprint reader.

17. The computer program product of claim 13, further comprising program instructions stored on the computer readable storage device to prompt the individual to resubmit the biometric reading if the confirmation fails.

18. The computer product of claim 13, wherein the test requires the individual to breathe into the testing apparatus.

19. A method for deploying a system for biometric-based identity confirmation, comprising:
deploying a computer infrastructure being operable to:
receive a submitted identity of an individual taking a test, the test comprising a spirograph test;
receive a biometric reading from the individual via a lip print reader coupled to the testing apparatus associated with the test, wherein the lip print reader comprises at least one of an optical lip print reader, an active capacitance lip print reader, and a passive capacitance lip print reader;
digitize the biometric reading;
transmit the digitized biometric reading to a device remote from the testing apparatus;
determine, at the device remote from the testing apparatus, a biometric-based identity of the individual using the digitized biometric reading;
confirm, at the device remote from the testing apparatus, whether the submitted identity matches the biometric-based identity;
notify the individual if the submitted identity does match the biometric-based identity; and
deny a result of the test if the submitted identity does not match the biometric-based identity;
wherein the lip print reader is configured to detect features comprising: grooves that run vertically across a lip of the individual; straight grooves that disappear half-way into the lip of the individual; grooves that fork on the lip; grooves that intersect on the lip of the individual; grooves that are reticulate on the lip of the individual; and grooves of other morphologies on the lip of the individual; and
wherein the computer infrastructure comprises at least one computer.

20. The method of claim 19, wherein the deployed computer infrastructure is further operable to prompt the individual to resubmit the biometric reading if the confirmation fails.

21. The method of claim 19, wherein the test requires the individual to breathe into the testing apparatus.

* * * * *